US005970787A

United States Patent [19]

Wignall

[11] Patent Number: 5,970,787

[45] Date of Patent: Oct. 26, 1999

[54] DOWNHOLE GRAVITY TOOL

[75] Inventor: Albert H. Wignall, Friendswood, Tex.

[73] Assignee: Schlumberger Technology Corporation, Houston, Tex.

[21] Appl. No.: 08/960,491

[22] Filed: Oct. 29, 1997

[51] Int. Cl.[6] .................................................. G01V 7/02

[52] U.S. Cl. .................................. 73/152.54; 73/382 R

[58] Field of Search .......................... 73/382 R, 382 G, 73/152.05, 152.54

[56] References Cited

U.S. PATENT DOCUMENTS

| | | | |
|---|---|---|---|
| 2,570,659 | 10/1951 | Fay . | |
| 2,618,156 | 11/1952 | Boucher . | |
| 2,657,581 | 11/1953 | Fay . | |
| 2,930,138 | 3/1960 | La Coste . | |
| 2,953,023 | 9/1960 | Goodell . | |
| 3,027,767 | 4/1962 | Slack et al. . | |
| 3,264,875 | 8/1966 | Goodell et al. . | |
| 3,472,076 | 10/1969 | Howell et al. . | |
| 3,995,479 | 12/1976 | Chapman, III . | |
| 4,040,189 | 8/1977 | La Coste | 73/152.54 |
| 4,445,371 | 5/1984 | Lautzenhiser . | |
| 4,475,386 | 10/1984 | Fitch et al. . | |
| 4,596,139 | 6/1986 | Gournay . | |
| 4,602,508 | 7/1986 | Fitch et al. . | |
| 4,803,479 | 2/1989 | Graebner et al. . | |
| 4,809,545 | 3/1989 | Lyle . | |
| 4,935,883 | 6/1990 | Hulsing, II | 73/382 G |
| 5,448,912 | 9/1995 | Black . | |

OTHER PUBLICATIONS

J. L. Brady, D. S. Wolcott, & C. L. V. Aiken, "Gravity Methods: Useful Techniques for Reservoir Surveillance", SPE 26095, May 26–28, 1993 SPE Western Region Meeting, Anhorage, Alaska, pp. 645–658.

J. L. Brady, D. S. Wolcott, & C. L. V. Aiken, "Gravity Methods: Useful Techniques for Reservoir Surveillance", Jul.–Aug. 1996, The Log Analyst, pp. 45–56.

*Primary Examiner*—John E. Chapman

*Attorney, Agent, or Firm*—John J. Ryberg; Brigitte L. Jeffery

[57] ABSTRACT

A tool for conducting gravimetry survey downhole in an earth formation includes a pressure vessel which houses a gravity sensor that is supported by a gimbal. The gravity sensor is aligned with vertical before taking gravity measurements by a first stepper motor and a second stepper motor. The first stepper motor incrementally rotates the gimbal about the pivot axis of the gimbal while the second stepper motor incrementally rotates the gimbal about the longitudinal axis of the pressure vessel. The stepper motors are controlled by an electronic processor that responds to signals from an accelerometer assembly that measures the inclination of the pressure vessel with respect to vertical. An elevator mechanism translates the gravity sensor from one station to the next inside the pressure vessel to make gravity measurements and an optical encoder monitors the position of the gravity sensor inside the pressure vessel.

31 Claims, 8 Drawing Sheets

FIG. 5A
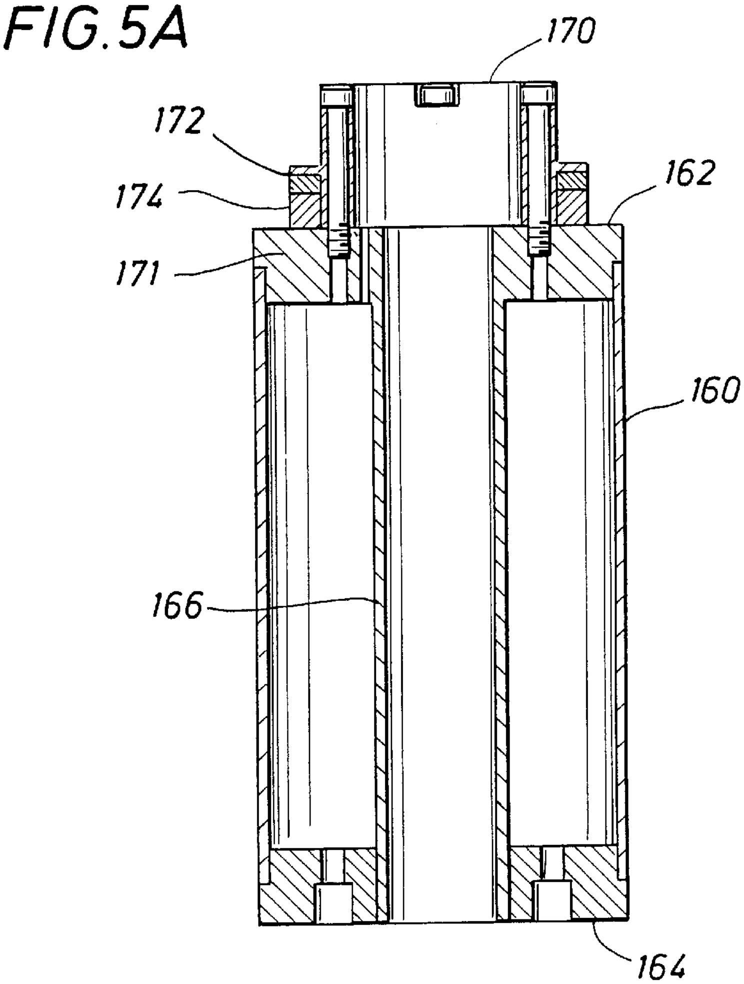
FIG. 5B
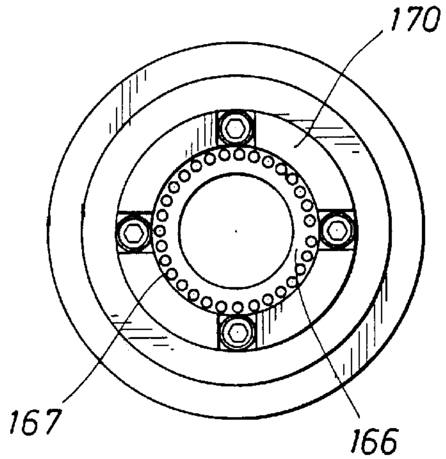
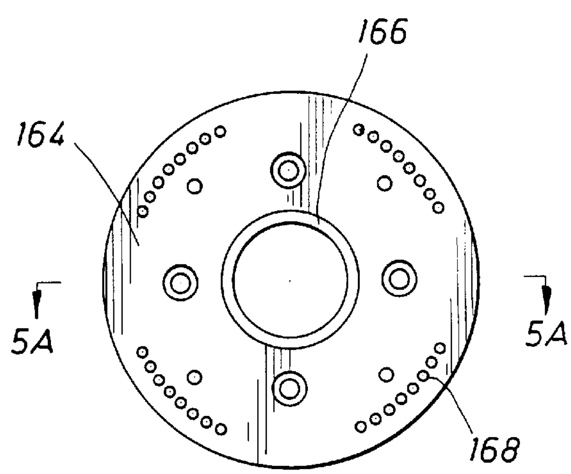
FIG. 5C

FIG. 6
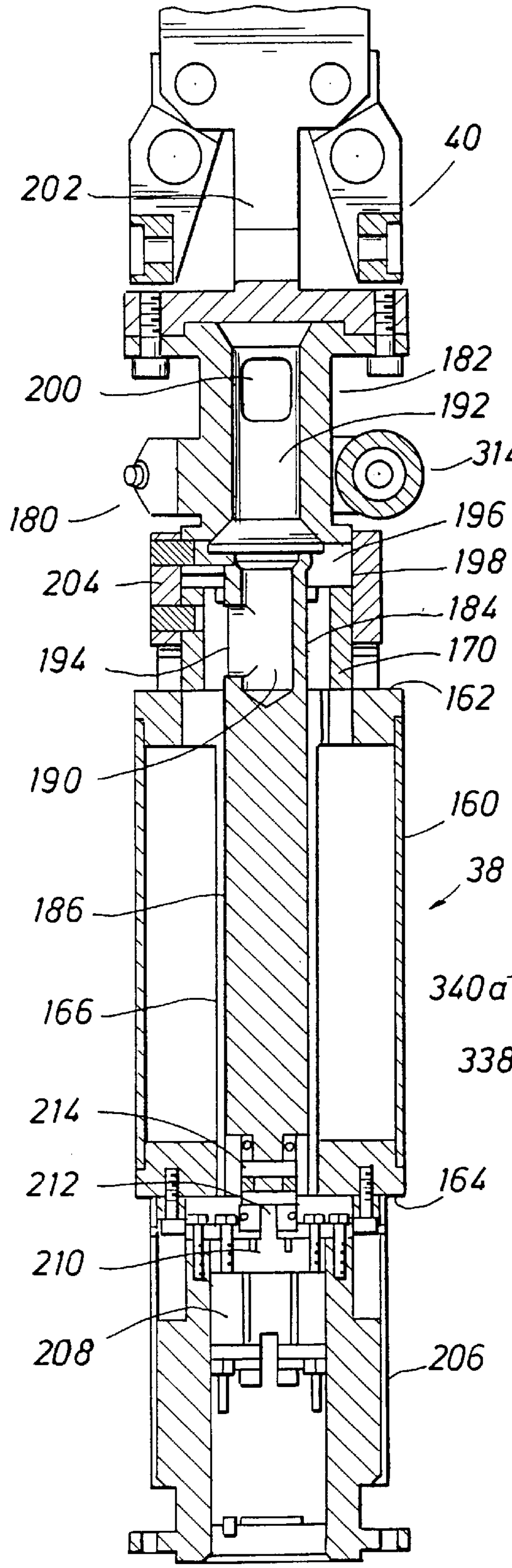
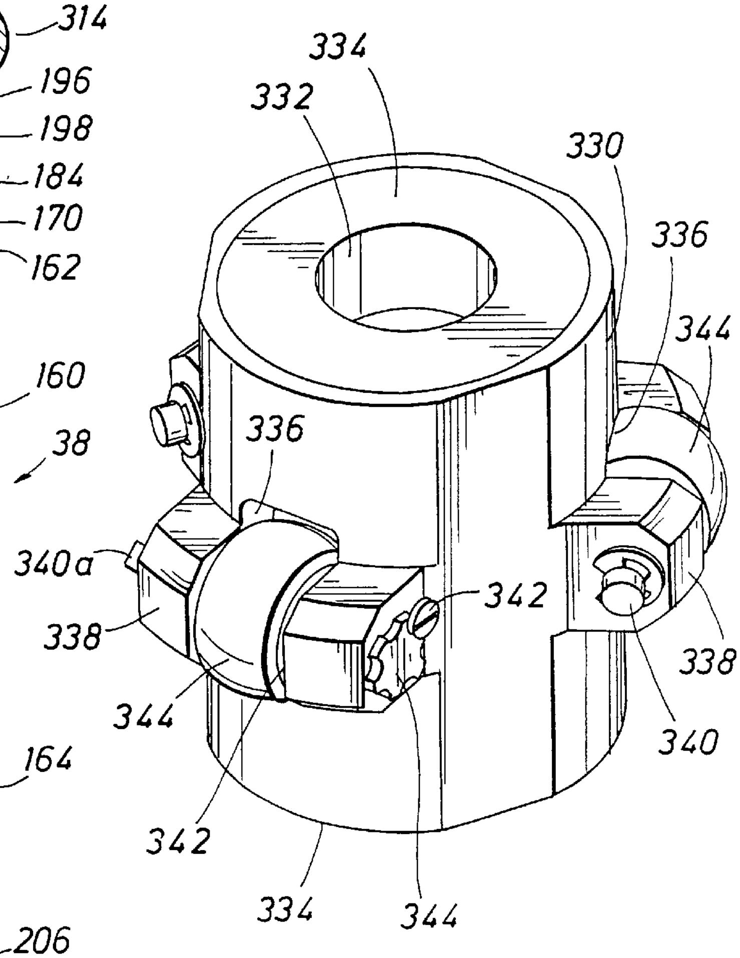
FIG. 11

FIG. 7
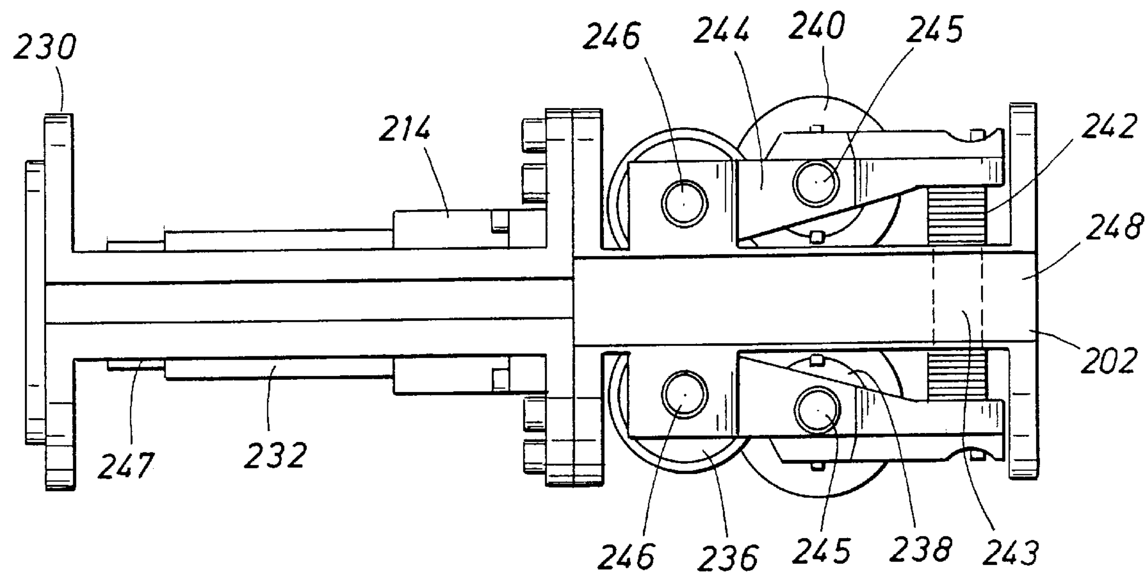
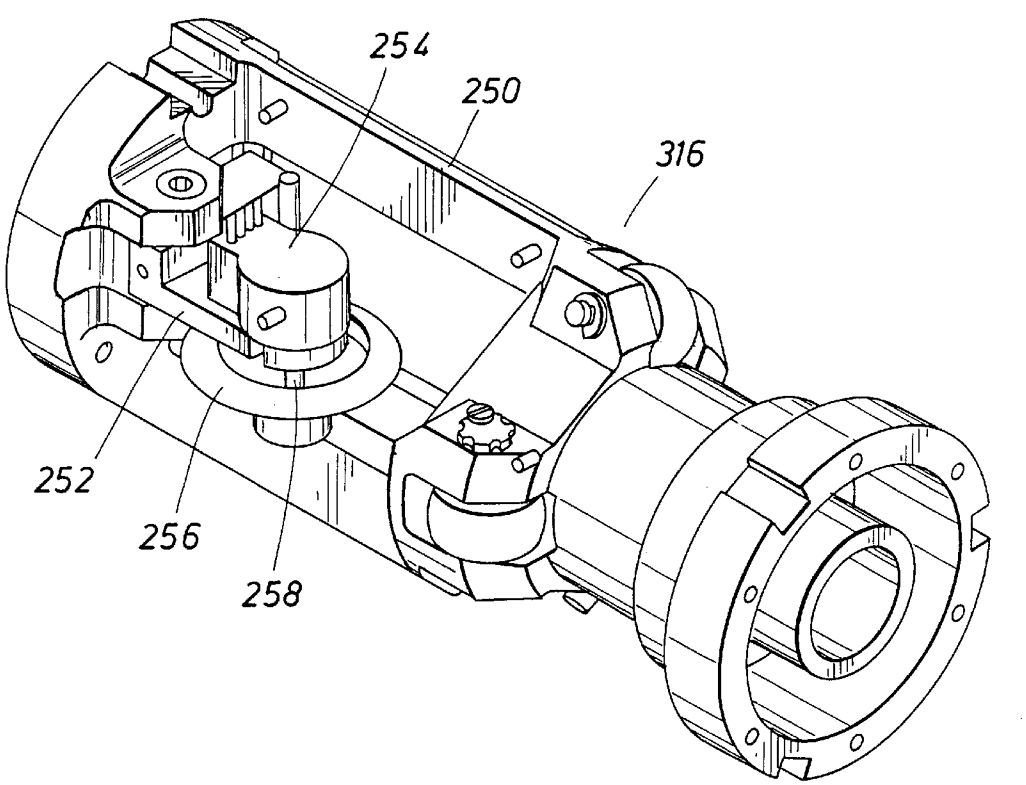
FIG. 8

DOWNHOLE GRAVITY TOOL

BACKGROUND OF THE INVENTION

Oil exploration involves evaluating reservoirs to determine the movement or absence of oil, gas, or water as the reservoir fluids are produced. Understanding movement of gas in reservoirs is important to the prevention of premature breakthroughs and optimization of reservoir performance. Gas movement in a reservoir can be monitored by gravity methods which include determination of borehole gravity and surface gravity of the reservoir. Borehole gravity data is used to map out the vertical distribution of oil and gas at a well and surface gravity is used to understand the surface distribution of gas.

Typically, borehole gravity surveys involve reading local earth gravity at a series of stations in a borehole. The difference in gravity (Δg) and the vertical distance (Δz) between two successive stations yield sufficient information to determine the bulk rock density of the strata adjacent the borehole. The bulk rock density is what gets mapped out to determine the vertical distribution of oil and gas as the reservoir fluids are produced.

Rock density, ρ, is given by the following expression:

$$\rho=(F-\Delta g/\Delta z)/(4\pi G)$$

where $\Delta g/\Delta z$ is the vertical gradient of gravity between two spaced apart stations, F is the free air gravity, and G is the universal gravitational constant. The free air gravity, F, is typically determined during borehole gravity surveys, so that the only unknown is the rock density, ρ.

The further apart the station measurements are made, the deeper the zone of investigation. A 5 ft interval would produce a zone of investigation of 0 to 25 ft radial from the borehole. The deeper zone of investigation makes it possible to determine the true gas-oil contact, free from borehole effects such as localized gas cone, mud, and casing.

Gravity measurements are typically monitored in the microgal ($10^{-6}$ cm/s$^2$) or nano-g range to ensure useable data that provide an indication of untapped pockets of oil or gas in the strata adjacent a borehole. This level of resolution in gravity measurements requires a highly precise gravity sensor and carefully implemented measuring techniques. For instance, the gravity sensor must be oriented so that the sensitive axis of the sensor is vertically aligned. A deviation of the sensitive axis of the sensor by an angle α from the vertical corresponds to an error of g.(1-cosα), where g is the gravitational acceleration. Thus, a deviation by an angle a equal to 45 μrad (or 0.00258°) from the vertical would result in an error of about 1 microgal.

In addition to keeping the sensitive axis of the gravity sensor aligned with the vertical during gravity measurements, the depth measurements of the stations should also be accurate to within 1 mm to obtain a density with accuracy of 0.01 g/cm$^3$.

SUMMARY OF THE INVENTION

In accordance with one aspect of the invention, a survey tool for obtaining gravimetric data in a borehole comprises an elongated, hollow vessel. A sensor housing is disposed inside the vessel. Inside the sensor housing is a gimbal which is supported for rotation on a gimbal shaft, the pivot axis of the gimbal shaft being angularly displaced from the longitudinal axis of the vessel. A gravity sensor which measures gravity is mounted inside the gimbal. A first drive means rotates the gimbal about the pivot axis of the gimbal shaft while a second drive means rotates the gimbal about the longitudinal axis of the vessel. A sensor assembly determines the inclination of the vessel with respect to the vertical. A controller controls the first and second drive means in response to signals from the sensor assembly.

BRIEF DESCRIPTION OF THE DRAWINGS

FIG. 5A is a cross-sectional view FIG. 5C along line A—A.

FIG. 5B is a top view of the slip ring assembly shown in FIG. 5A.

FIG. 5C is a bottom view of the slip ring assembly shown in FIG. 5A.

FIG. 6 is a cross-sectional view of a segment of an embodiment of the present invention showing connections between a roll-axis drive, a slip ring assembly, and an elevator mechanism.

FIG. 7 is a side view of an elevator mechanism.

FIG. 8 is a perspective view of an optical encoder assembly.

FIG. 11 is a perspective view of a roller assembly.

DESCRIPTION OF THE PREFERRED EMBODIMENTS

Figure 1:
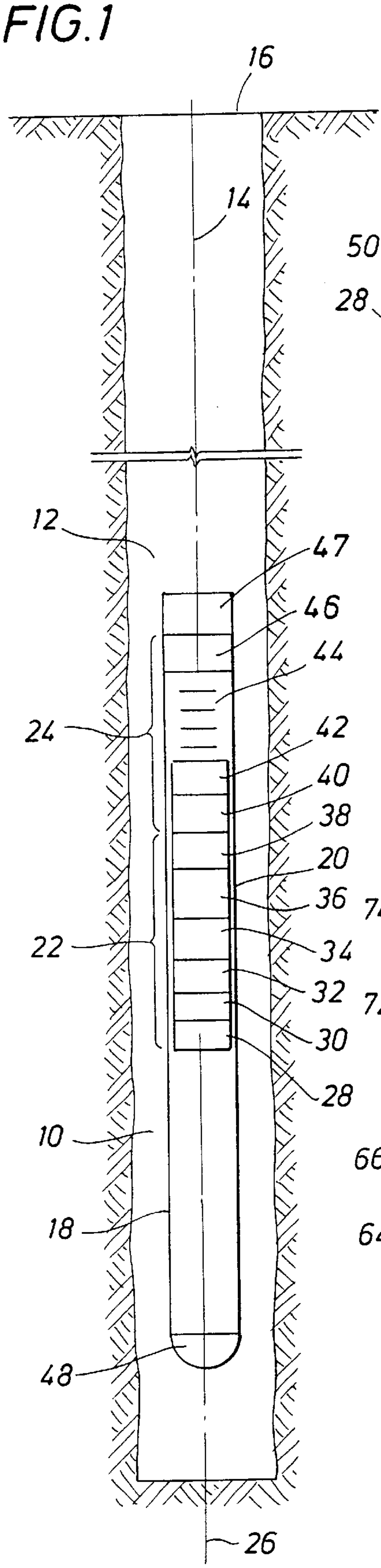
FIG. 1 is a schematic of a sonde in a borehole.

Referring to the drawing wherein like reference characters are used for like parts throughout the several views, a sonde 10, shown in FIG. 1, is suspended in a borehole 12 on the end of a wireline 14 that is supported at the surface 16. The wireline 14 is used to lower and raise the sonde 10 within the borehole 12. The positioning of the sonde 10 in the borehole 12 is controlled from the surface 16. The borehole 12 may be cased, lined, or open.

Sonde 10 includes an elongated, hollow, pressure vessel 18 which is capable of withstanding the pressures, temperatures, and fluids of the borehole environment. Inside the pressure vessel 18 is a gravity tool 20. The gravity tool 20 is made up of a rotatable portion 22 and a non-rotatable portion 24. The rotatable portion 22 may rotate about the longitudinal axis 26 of the pressure vessel 18. Both the rotatable portion 22 and the non-rotatable portion 24 are arranged to travel simultaneously along the longitudinal axis 26 of the pressure vessel 18 to make gravity measurements.

The rotatable portion 22 includes a gravity meter 28, a gimbal drive assembly 30, an electronic controller 32, an accelerometer assembly 34, a roll-axis drive 36, and a slip ring assembly 38. The gravity meter 28 includes a gravity sensor for measuring gravity at stations along the borehole. The gimbal drive assembly 30 and the roll-axis drive 36 align the sensitive axis of the gravity sensor with the vertical before gravity measurements are taken at a measuring station.

The operation of the gimbal drive assembly 30 and the roll-axis drive 36 are monitored by the electronic controller 32 which responds to signals from the accelerometer assembly 34. The signals from the accelerometer assembly 34 are indicative of the inclination of the gravity tool 20 with respect to the vertical. The slip ring assembly 38 couples electrical signals between the rotatable portion 22 and the non-rotatable portion 24 of the gravity tool 20.

The non-rotatable portion 24 includes an elevator mechanism 40, an optical encoder assembly 42, and a spring-loaded harness assembly 44. The elevator mechanism 40 translates the entire gravity tool 20 from one station to the next inside the pressure vessel 18. The optical encoder assembly 42 measures the displacement of the gravity meter 28 from one station to the next. The spring-loaded harness assembly 44 controls electrical wiring harness as the gravity tool 20 moves along the length of the pressure vessel 18.

The gravity tool 20 is attached to a head assembly 46 which includes a plug (not shown) through which power may be supplied to the gravity tool 20 from the surface 16. A nose assembly 48 serves as a shock absorber when the gravity tool 20 impacts the nose assembly 48.

Although, FIG. 1 shows the gravity tool 20 in a vertical borehole, it should be clear that the present invention is not limited to a vertical borehole but can be used in a deviated or horizontal borehole.

Figure 2:
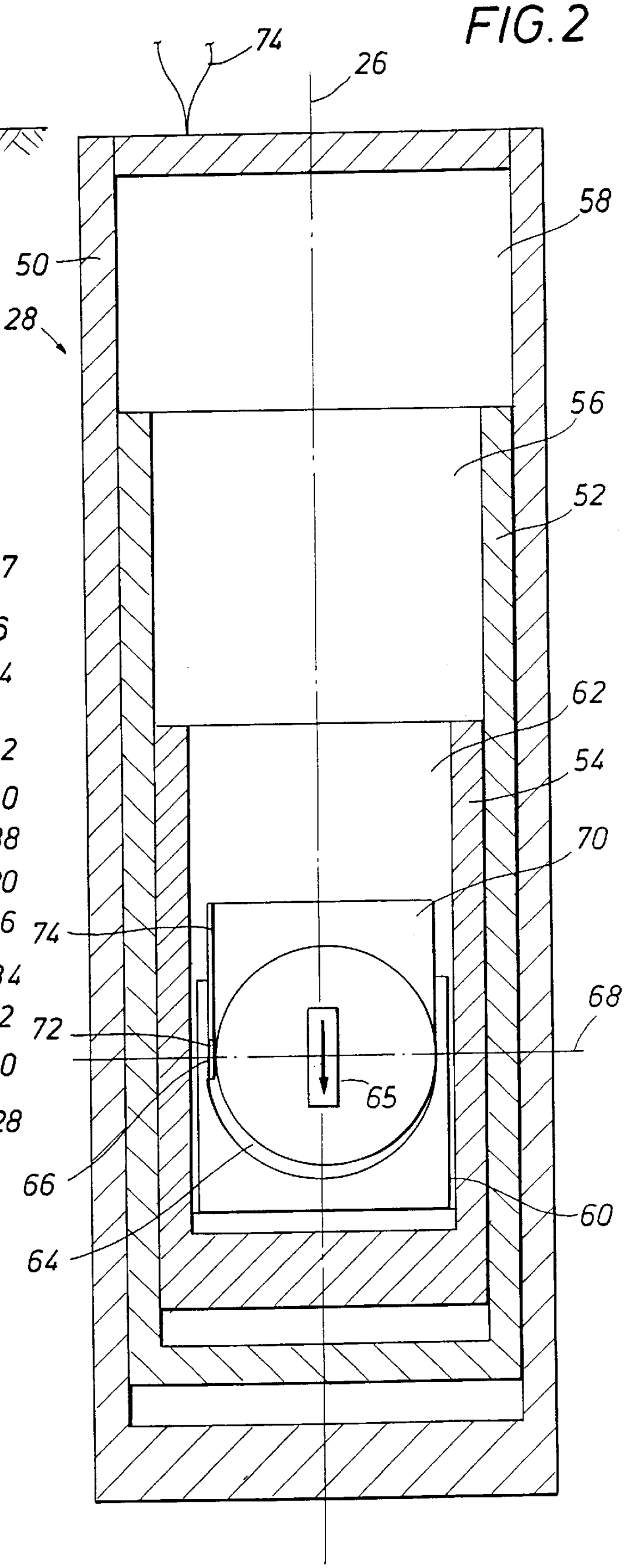
FIG. 2 is a schematic of a gravity meter.

Referring to FIG. 2, the gravity meter 28 includes an outer dewar 50. Inside the outer dewar 50 is a heater sleeve 52. The heater sleeve 52 slips over an inner dewar 54 and a PC board 56. An outer stopper 58 holds the heater sleeve 52, the PC board 56, and the inner dewar 54 in place inside the outer dewar 50.

Inside the inner dewar 50 is a sensor housing 60 which is held in place by an inner stopper 62. The sensor housing 60 includes a heater (not shown). A gimbal 64 supported on a gimbal shaft 66 is mounted for rotation inside the sensor housing 60. The pivot axis 68 of the gimbal 64 is displaced at an angle to the longitudinal axis 26 of the pressure vessel 18. Preferably, the pivot axis 68 of the gimbal 64 is orthogonal to the longitudinal axis 26 of the pressure vessel 18. A gravity sensor 65 that measures gravity is supported inside the gimbal 64.

The dewars 50 and 54 define a temperature-stabilized chamber 68 for the gravity sensor 65. Typically, the temperature of the chamber is maintained at 25° C. above the highest ambient temperature rating in the borehole. The temperature is controlled to 0.001° C. and modeled to $10^{-6°}$ C. Small residual temperature changes in the chamber 70 are compensated for by heaters in the sensor housing 60 and in the heater sleeve 52. The stoppers 58 and 62 at the ends of the dewars 50 and 54, respectively, are also heated and serve to prevent heat flow through the ends of the dewars. The PC board 56 adjacent the inner dewar 54 controls the heaters in the gravity meter 28.

The heater sleeve 52 contains magnetic shield which protects the gravity sensor 65 in the gimbal 64 from magnetic fields in the borehole 12. Magnetic fields in the borehole 12 can create torques on the gravity sensor which may result in errors in gravity measurements. It should be clear that the invention is not limited to the heater sleeve containing the magnetic shield. The magnetic shield may be equally located with the sensor housing or the dewars.

The gimbal shaft 66 of the gimbal 64 supports a pulley 72. A gimbal cable 74 is wound on the pulley 72 with the free ends of the gimbal cable 74 extending through the sensor housing 60 to the exterior of the gravity meter 28. During operation of the gravity tool 20, the free ends of the gimbal cable 74 would be linked to the gimbal drive assembly 30 which may extend or retract the free ends of the gimbal cable 74 to cause the gimbal 64 to be rotated about its pivot axis 68 through a predetermined angle and in a predetermined direction. The diameter of gimbal cable 74 can be made very small to minimize heat loss and transfer between dewars 50 and 54 and the environment.

Figure 3A:
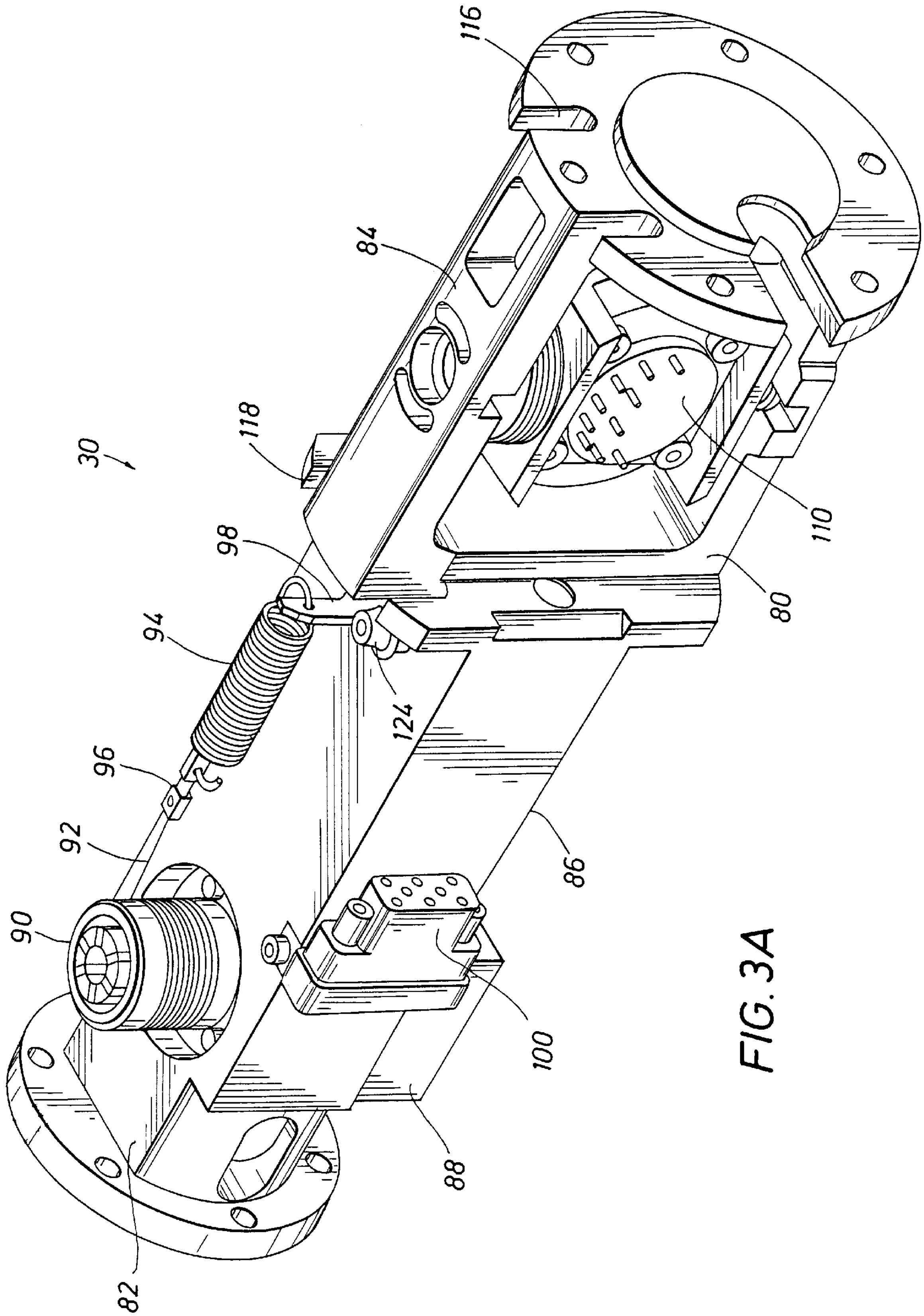
FIG. 3A is a perspective view of a gimbal drive assembly.
Figure 3B:
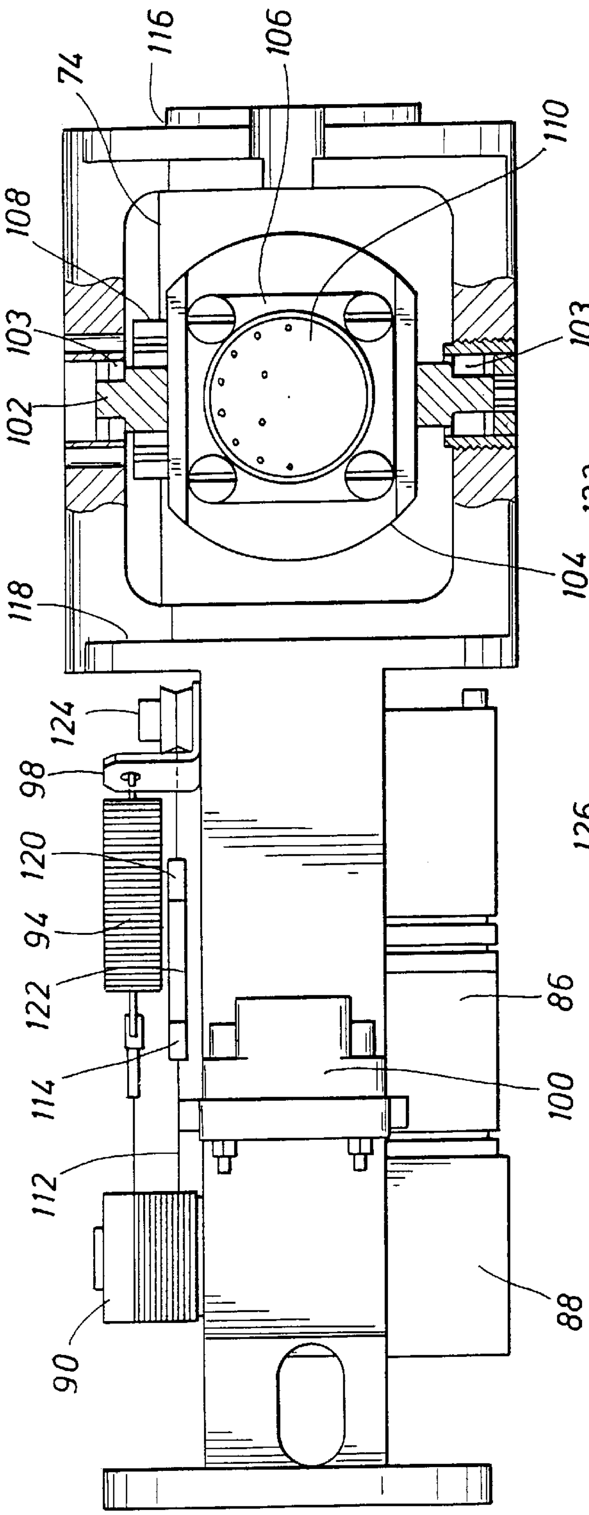
FIG. 3B is a side view of FIG. 3A.

Referring to FIGS. 3A and 3B, the gimbal drive assembly 30 includes a gimbal drive frame 80. The gimbal drive frame 80 has an upper portion 82 and a lower portion 84. A stepper motor 86, a gear box 88, and a bobbin 90 are mounted on the upper portion 82 of the gimbal drive frame 80. The drive shaft of the stepper motor 86 is coupled to the gear box 88 which drives the bobbin 90. The free end of a backlash cable 92 wound on the bobbin 90 is attached to a spring 94 by a turnbuckle 96. The spring 94 is in turn coupled to a bracket 98 that is mounted on the gimbal drive frame 80. The spring 94 is arranged to eliminate backlash when the stepper motor 86 is stopped or reversed. A connector 100 mounted on a side of the upper portion 82 of the gimbal drive frame 80 allows power to be supplied to the stepper motor 86.

On the lower portion 84 of the gimbal drive frame 80 is a shaft 102 that is supported at its ends on a pair of ball bearings 103. A sensor ring 104 which supports a sensor mounting ring 106 is mounted on the shaft 102. A sensor adjuster ring stop 108 is supported on the shaft 102 and bolted to the top of the sensor mounting ring 106 so that the sensor adjuster ring stop 108 and the sensor mounting ring 106 can rotate together.

An angular tilt sensor 110 is mounted on the sensor mounting ring 106. The angular tilt sensor 110 is a uniaxial accelerometer that is arranged to provide an error signal indicating departure of the sensitive axis of the gravity sensor 65 from the vertical. When the sensitive axis of the gravity sensor 65 is aligned with the vertical, the angular tilt sensor 110 is level and the output voltage of the tilt sensor is equal to $V_{offset}$. As the pressure vessel 18 traverses a deviated borehole, the output voltage of the tilt sensor becomes $V_{offset}+V_{tilt}$, where $V_{tilt}$ is proportional to the tilt angle of the sensitive axis of the gravity sensor 65 with respect to a fixed reference. The angular tilt sensor 110 uses the Earth's gravitational field as a reference.

In operation, a drive cable 112 is wound on the bobbin 90. The free ends of the drive cable 112 are attached to turnbuckles 114. The free ends of the gimbal cable 74 from the gravity meter 28 pass through a first set of slots 116 in the lower portion 84 of the gimbal drive frame 80 and a second set of slots 118 in the upper portion 82 of the gimbal drive frame 80 to attach to turnbuckles 120. Turnbuckles 120 are linked to turnbuckles 114 by connectors 122. A portion of one of the free ends of the gimbal cable 74 is wound once around the sensor adjuster ring stop 108 to allow the angular tilt sensor 110 and the gimbal 64 in the gravity meter 28 to rotate concurrently. The drive cable 112 and the gimbal cable 74 are appropriately tensioned to eliminate backlash in the cable system when the stepper motor 86 is stopped or reversed. A bushing idler 124 ensures that the cables 74 and 112 follow a straight course as they extend and retract.

Signals from the angular tilt sensor 110 are sent to the electronic controller 32. The electronic controller 32 uses these signals to determine if the gimbal drive assembly 30 should be operated to drive the gimbal 64 to maintain the vertical orientation of the gravity sensor 65. The electronic controller 32 may send an electrical pulse to the stepper motor 86 to cause the drive shaft of the stepper motor 86 to rotate through a predetermined fixed angle. As the drive shaft of the stepper motor 86 rotates, the drive cable 112 winds on or unwinds from the bobbin 90. The movement of the drive cable 112 is transmitted to the gimbal cable 74, causing the gimbal 64 and the angular tilt sensor 110 to rotate about their respective pivot axes. The angular tilt sensor 110 and the gimbal 64 can rotate a full 360° about their pivot axes, if necessary. As the gimbal 64 and the angular tilt sensor 110 rotates, feedback signals are sent to the electronic controller 32 by the angular tilt sensor 110. When the angular tilt sensor 110 sends a signal that indicates that the angular tilt sensor 110 is level, the electronic controller 32 stops the stepper motor 86. The electronic controller 32 together with the gimbal drive assembly 30 can keep the gravity sensor vertical to within 48.5 μrad (or 0.00278°) .

While the present invention is illustrated as using the gimbal drive assembly 30 to rotate the gimbal 64 about the pivot axis 68, it should be clear that other mechanisms, such as push rods, rack and pinion, and gear sets, may also be used to rotate the gimbal 64. The gravity sensor 65 may also be provided with a built-in tilt meter which may be controlled to align the sensitive axis of the gravity sensor with vertical; however, the typical range of a built-in tilt meter is of the order of 4.85 mrad (or 0.278°). The range of the angular tilt sensor 110 which tracks the position of the gravity sensor 65 with respect to vertical is 360°, enabling the gimbal 64 to effectively align the sensitive axis of the gravity sensor 65 in any deviated or horizontal borehole. Also, the present invention is equally applicable to applications where a sensor may need to be at any predetermined angle to vertical since the angular tilt sensor is arranged to give continuous feedback signals indicative of the departure of the sensor from vertical.

Figure 4:
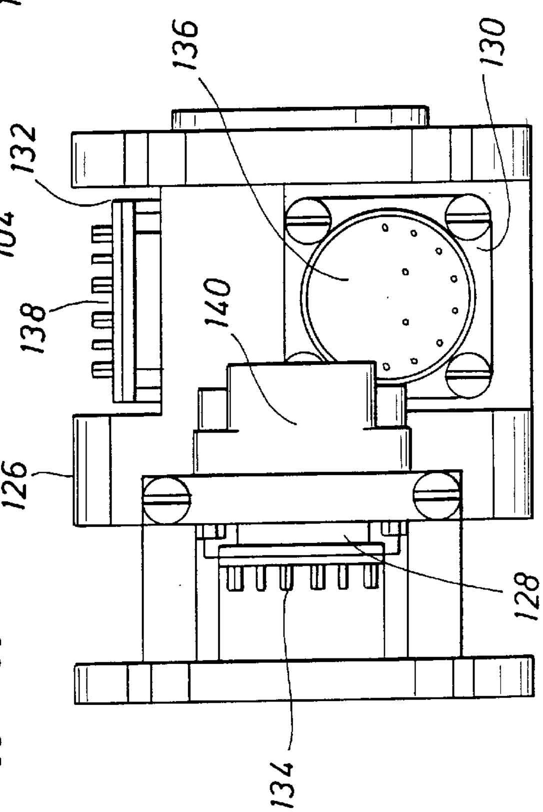
FIG. 4 is a side view of an accelerometer assembly.

Referring to FIG. 4, the accelerometer assembly 34 includes a sensor frame 126. A first sensor ring 128, a second sensor ring 130, and a third sensor ring 132 are mounted on the sensor frame 126. Single-axis accelerometers 134, 136, and 138 are mounted on the sensor rings 128, 130, and 132, respectively. The sensitive axes of the three accelerometers 134, 136, and 138 are orthogonal to each other, with the sensitive axis of the accelerometer 134 being coincident with the longitudinal axis 26 of the pressure vessel 18. The three accelerometers 134, 136, and 138 measure instantaneous acceleration along their corresponding sensitive axes. This information is sent to the electronic controller 32 to determine the pitch and roll inclinations of the gravity tool 20. A power distribution board (not shown) is mounted inside the sensor frame 126 for power distribution to the accelerometer assembly 34 and electronic controller 32.

Referring to FIGS. 5A–5C, the slip ring assembly 38 is a 32 conductor slip ring/brush block assembly which includes a slip ring housing 160. The slip ring housing 160 has an upper end 162 and a lower end 164. Inside the slip ring housing is a tube 166 which is arranged to receive a shaft. The upper end of the tube 166 is provided with a plurality of apertures 167 (see FIG. 5B). The lower end 164 of the slip ring housing 160 is provided with a plurality of apertures 168. Electrical wires extending through the slip ring housing exit through the apertures 167 and 168 at the upper and lower ends 162 and 164 of the slip ring housing 160, respectively. In between the slip ring housing 160 and the tube 166 are a pair of ball bearings (not shown) which support the slip ring housing 160 for rotation about the axial axis of the tube 166. The rotors, stators, brushes, and slip rings (all of which are not shown) that conduct electrical signals in the slip ring assembly 38 are located between the walls of the tube 166 and the slip ring housing 160.

A sleeve 170 is bolted to the upper end 171 of the tube 166. Between the sleeve 170 and the tube 166 are wave springs 172 and Teflon washer 174 which function to prevent backlash when the roll-axis drive 36 driving the rotatable portion 22 of the gravity tool 20 is stopped.

Referring to FIG. 6, a coupling assembly 180 which couples the slip ring assembly 38 to the elevator mechanism 40 is at the upper end 162 of the slip ring housing 160. The coupling assembly 190 has an upper portion 182 and a lower portion 184. The lower portion 184 includes a shaft 186 which mates with the tube 166 in the slip ring housing 160. Shaft 186 has an internal bore 190 for receiving electrical wires from the slip ring assembly 38. The bore 190 communicates with a channel 192 in the upper portion 182 of the coupling assembly 180. Electrical wires extending out of apertures 167 in the upper end of the tube 166 (see FIG. 5B) enter the channel 192 through a slot 194 which communicates with the bore 190 and slots 196 which are circumferentially arranged about the portion 198 of the coupling assembly 180. All the wires in the channel 192 extend out of slots 200 in the upper portion of the coupling assembly 180 and are received in channels 202 in the elevator mechanism 40. The coupling assembly 180 is secured to the sleeve 170 that is bolted to the tube 166 by a pair of circular plates 204.

A motor mount 206 which houses the roll-axis drive 36 is bolted to the lower end 164 of the slip ring housing 160. The roll-axis drive 36 includes a stepper motor 208 which drives a transmission system 210. The transmission shaft 212 of the transmission system 210 is coupled to the shaft 186 of the coupling assembly 180 by a shaft coupling 214.

In operation, electrical pulses are sent to the stepper motor 208 of the roll-axis drive 36, causing the drive shaft of the stepper motor 208 to rotate through a predetermined angle. The drive shaft of the stepper motor 208 in turn drives the transmission system 210. The transmission shaft 212 attempts to rotate the shaft 186 of the coupling assembly 180. However, the coupling assembly 180 is secured to the non-rotatable portion of the gravity tool 20 so that the shaft 186 of the coupling assembly 180 does not rotate. Instead, the resultant torque generated between the driven transmission shaft 212 and the shaft 186 of the coupling assembly 180 causes the motor mount 206 which supports the transmission shaft 212 to rotate. As the motor mount 206 rotates, the slip ring housing 160 which is bolted to the motor mount 206 also rotates and so does the accelerometer assembly 34, the electronic controller 32, the gimbal drive assembly 30, and the gravity meter 28. The tube 166 does not rotate with the slip ring housing 160.

Referring to FIG. 7, the elevator mechanism 40 used to move the gravity tool 20 along the length of the pressure vessel 18 includes an elevator housing 230. Mounted inside the elevator housing 230 is a brushless DC motor 232. The motor 32 can also be a stepper motor. The drive shaft of the motor 232 is coupled to a reduction gear box 214 that drives a pair of worm gears 236. Each worm gear 236 drives a spur gear 238. On each spur gear 238 is a wheel 240 which is arranged to contact the inside surface of the pressure vessel 18. When the spur gears 238 are driven, the wheels 240 ride up and down along the length of the pressure vessel 18.

The wheels 240 are preloaded against the wall of the pressure vessel 18 using belleville springs 242. The belleville springs 242 are supported on a rod 243. On the ends of the rod 243 are levers 244. The levers 244 are connected to the shafts 245 of the spur gears 238 and to the shafts 246 of the worm gears 236. This arrangement allows the springs 242 to exert force on the levers 244 to push the wheels 240 against the inside diameter of the pressure vessel 18. The force applied to the wall of the pressure vessel 18 by the springs 242 is sufficient to provide traction to lift the weight of the gravity tool 20 when the gravity tool 20 is in the vertical position.

The motor 232 is provided with a brake 247 that prevents the motor 232 from turning when it is on station. The worm gears 236 may also function as a brake if a gear pitch is selected that does not back-drive when the gravity tool 20 is vertical. The channels 202 on the sides of the elevator housing 230 receive electrical wires from the coupling assembly 180 (shown in FIG. 6).

While the illustrated embodiment shows the elevator mechanism 40 as being linked to the gravity meter 28 so as to move the gravity meter 28 inside the pressure vessel 18, it should be clear that the present invention is not limited to using the elevator mechanism 40 to move the gravity meter 28 inside the vessel 18. For instance, the elevator mechanism 40 can be sealed within an oil-filled enclosure and mounted external to the pressure vessel 18 and the gravity meter 28 can be held at a fixed position inside the vessel 18. The externally mounted elevator mechanism would then support and translate the pressure vessel along the length of the borehole to make gravity measurements. This gives a much greater depth of investigation, since the gravity sensor can be moved to stations beyond that achievable inside the pressure vessel.

A conveyance mechanism, such as a cable supported on pulleys or a rotatable winch at the surface, can also be used to move the pressure vessel along the length of the borehole instead of the elevator mechanism. The pressure vessel can be quickly lowered into the borehole by the aid of a casing collar locator 47 (shown in FIG. 1) which may be mounted on the pressure vessel. The casing collar locator, which may be an electromagnetic pickup or acoustic transducer or mechanical feeler gauge, finds casing collars that are located at known depths inside the borehole. Once the casing collars are located, the measuring stations can be accurately located to within 1 mm or 2 mm. Also, the elevator mechanism can be used inside the pressure vessel to move the gravity sensor along the length of the pressure vessel while a conveyance mechanism is used to move the pressure vessel along the length of the borehole.

Referring to FIG. 8, the optical encoder assembly 42 includes a mounting frame 250. A lever 252 is spring mounted on the mounting frame 250. The lever 252 supports an optical encoder 254. An encoder wheel 256 is connected to the optical encoder by a shaft 258. The encoder wheel 256 is preferably made of a material that does not change dimensions with temperature to eliminate the need for temperature correction on the measured displacement. A suitable material is invar. As the wheel 256 rotates, the shaft 258 also rotates. The optical encoder 254 delivers electrical pulses which are proportional to the speed of the shaft 258 at its output terminal. A connector 260 is mounted inside the mounting frame 250 for connecting electrical wires from the elevator mechanism 40 to the optical encoder assembly 42. A PC board (not shown) is also provided on board to record readings from the optical encoder 254.

Several other means exist for measuring the displacement of the gravity meter inside the pressure vessel. For instance, if a stepper motor is used in the elevator mechanism 40, the steps required to move from one station to the next can be counted and translated to displacement. Also a magnetic or optical pickup can measure the rotation of the worm gear or spur gear of the elevator mechanism 40 as the elevator mechanism moves the gravity tool 20. An electrical encoder can also be used in place of an optical encoder.

Figure 9:
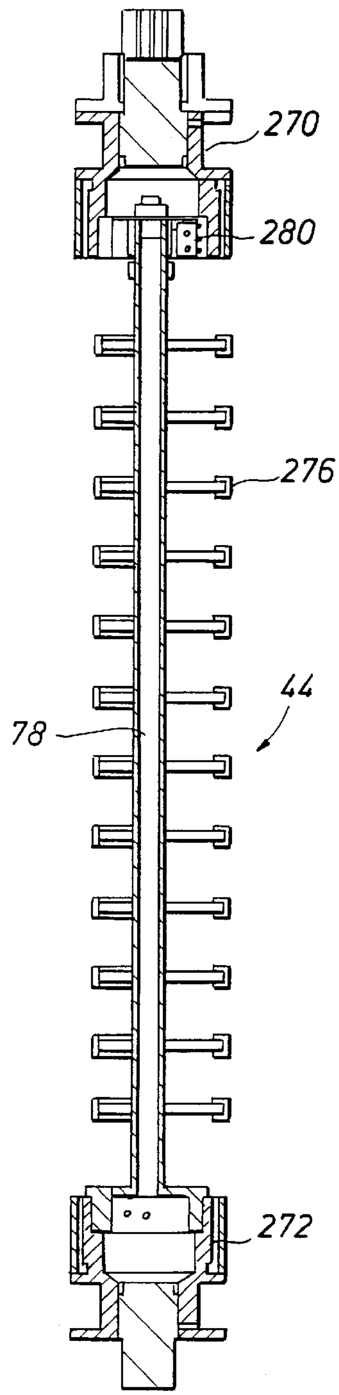
FIG. 9 is a cross-sectional view of a spring-loaded harness assembly.

Referring to FIG. 9, the harness assembly 44 includes an upper portion 270 and a lower portion 272 which are linked by a flexible helical spring (not shown). Supports 276 are inserted in the helical spring at spaced intervals along the length of the helical spring to keep the helical spring from vibrating during gravity measurement. The spring rate of the helical spring can be set such that the elevator mechanism 40 does not have to support the weight of the harness assembly 44 when the helical spring is fully extended.

A rod 278 attached to the lower portion 272 moves with the elevator mechanism 40, inside the channel created by the coils of the helical spring, as the elevator mechanism 40 translates the gravity meter 28 from one station to the next inside the pressure vessel 18. The rod 278 is arranged to contact a limit switch 280 in the upper portion 270 of the harness assembly 44 when the gravity meter 28 has reached the maximum upper limit or home position.

A cable containing insulated electrical wires runs from the upper portion 270 to the lower portion 272. The cable is pre-coiled so that it fits inside the channel created by the coils of the helical spring and over the rod 278. The cable stretches or recoils as the gravity meter 28 is translated inside the pressure vessel 18.

The overall design of the gravity tool is a belted system which allows the diameter of the tool to be fairly small, about 3 ⅜", and scaleable to 1 11/16". The assembled gravity tool 20 is shown in sequential segments in FIGS. 10A–10D.

Figure 10A:
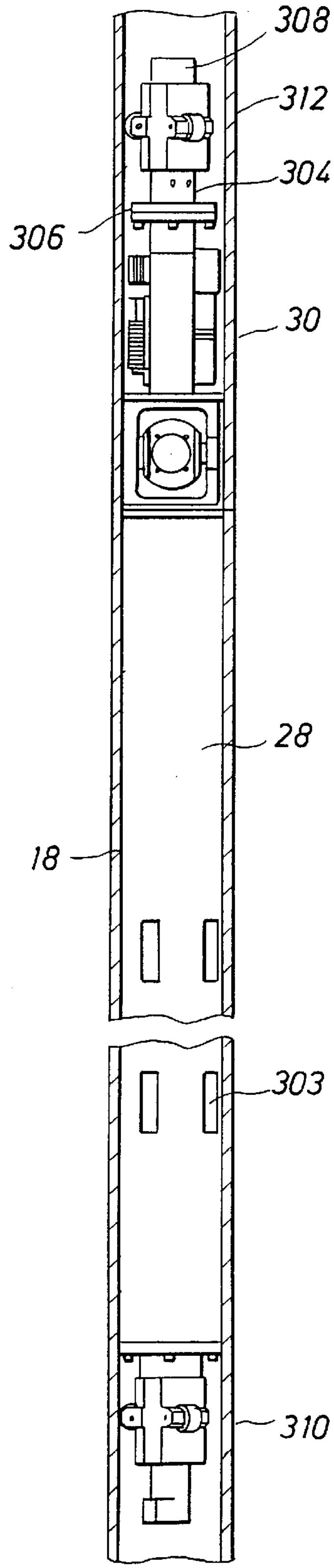
FIGS. 10A–10D are sequential segments of an embodiment of the present invention.

As shown in FIG. 10A, the gravity meter 28 is at the downhole end of the gravity tool 20. Teflon pads 303 are provided on the gravity meter 28 to space the surface of the gravity meter 28 from the inner surface of the pressure vessel 18. Coupled to one end of the gravity meter 28 is the gimbal drive assembly 30 which aligns the gravity sensor in the gravity meter 28 with the vertical. The gimbal drive assembly 30 is coupled to the electronic controller 32 by a coupling assembly 304. The coupling assembly 304 has a flange portion 306 and a shaft portion 308. The flange portion 306 is bolted to the gimbal drive assembly 30 and the shaft portion 308 is attached to the mounting bracket 309 of the electronic controller 32.

Figure 10B:
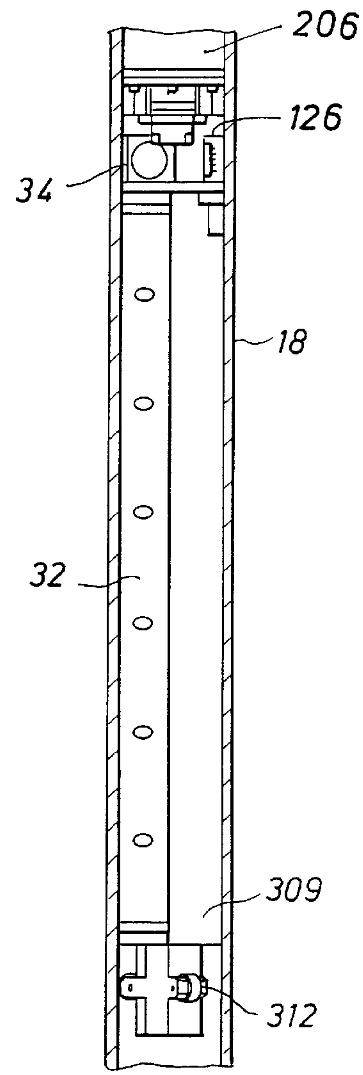

As shown in FIG. 10B, the mounting bracket 309 of the electronic controller 32 is coupled to the sensor frame 126 of the accelerometer assembly 34. The sensor frame 126 is bolted to the motor mount 206 which houses the roll-axis drive 36.

Figure 10C:
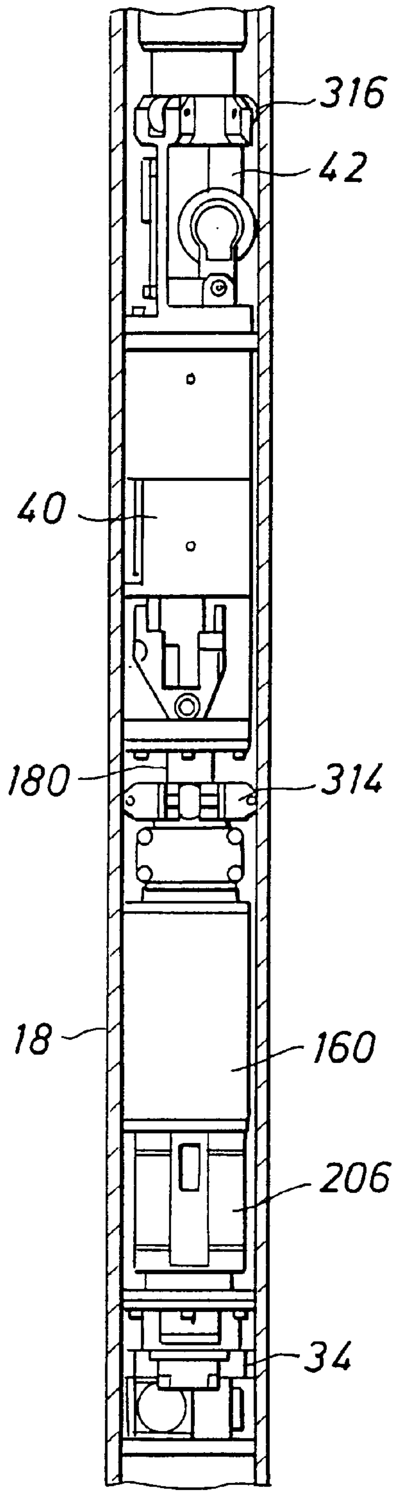

As shown in FIG. 10C, the motor mount 206 is bolted to the slip ring housing 160 of the slip ring assembly 38. The stationary tube 166 (shown in FIG. 5A) in the slip ring housing is coupled to the elevator mechanism 40 by the coupling assembly 180. The optical encoder assembly 42 is mounted on the elevator mechanism 40.

Figure 10D:
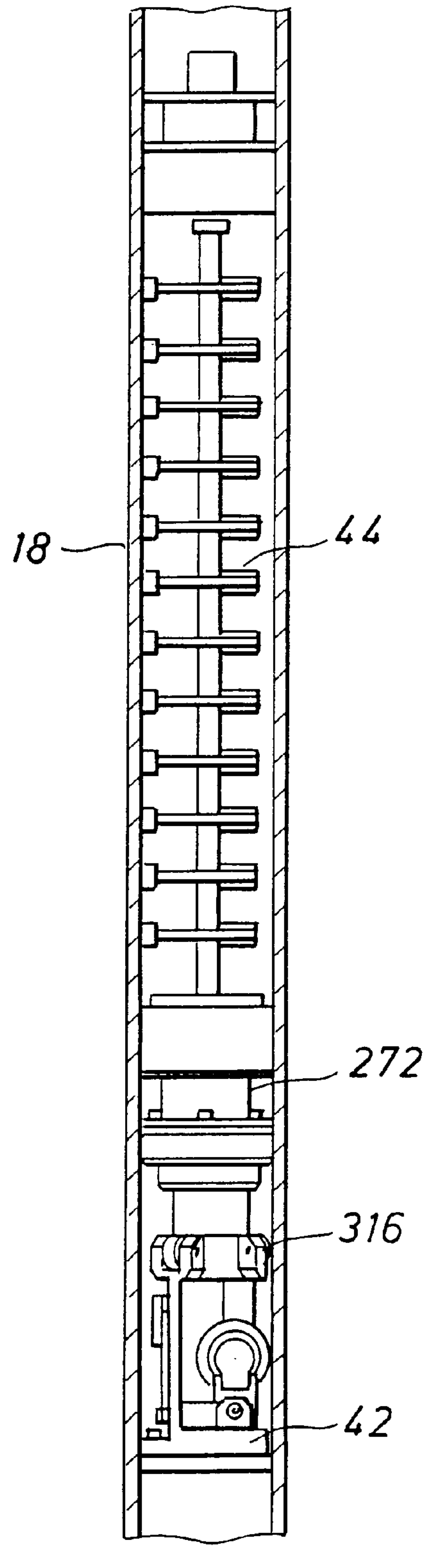

As shown in FIG. 10D, the optical encoder assembly 42 is bolted to the lower portion 272 of the spring-loaded harness assembly 44.

Roller assemblies 310, 312, 314, and 316 center the gravity tool 20 inside the pressure vessel 18. Roller assemblies 310 and 312, which support the elevator mechanism 40 and the optical assembly 42, permit axial and rotational movement of the rotatable portion of the gravity tool 20 in the pressure vessel 18. Roller assemblies 314 and 316, which support non-rotatable portion of the gravity tool 20, only permit axial movement in the pressure vessel 18.

As shown in FIG. 11, the roller assembly 310 (also roller assembly 312) that supports the gimbal drive assembly 30 and the gravity meter 28 for rotation about the longitudinal axis 26 of the pressure vessel 18 has a body 330 which is provided with an internal bore 332. Inside the bore 332 is a pair of ball bearings 334 which support the shaft portion 308 of the coupling assembly 304 (shown in FIG. 10A).

In the wall of the body 330 are three slots 336 that are spaced 120° apart along the circumference of the body 330. On either side of the slots 336 is a pair of mounting blocks 338 projecting outwardly from the wall of the body 330. The mounting blocks 338 are integrally formed with the body 330. The mounting blocks 338 have bores for receiving the ends of axles 340. Each axle 340 is supported on a pair of preloaded ball bearings 342 that are fixed to a side of the mounting blocks 338. The axles 340 may be stiff bow springs to help eliminate radial play.

A roller 344 is mounted on each axle 340. Rollers 344 fit into the slots 336 in the wall of the body 330. The rollers 344 are arranged to ride along the wall of the pressure vessel in a direction parallel to the longitudinal axis of the pressure vessel.

One of the axles 340*a* is eccentrically mounted on its supporting bearing to allow for tight fitting of the roller assembly 310 with the inside diameter of the pressure vessel 18. The position of the eccentrically mounted axle 340*a* may be adjusted by loosening the screw 342 which locks a sprocket 344 in place on the side of one of the mounting blocks. When the screw 342 is loosened, the axle 340*a* can be adjusted so that the rollers 344 fit tightly with the inside diameter of the pressure vessel 18.

The roller assemblies 314 and 316 are similar to the roller assemblies 310 and 312, except that they their bores are not lined with bearings and the roller assembly bodies are fixedly attached to the coupling assembly 180 and the optical encoder assembly 42, respectively, such that the coupling assembly 180 and optical encoder assembly 42 do not rotate when the roll-axis drive 36 turns the rotatable portion of the gravity tool 20.

In operation, the sonde 10 is lowered into the borehole 12 on the end of a wireline 14. As the sonde 10 is lowered, the electronic processor 36 is continually receiving signals from the angular tilt sensor and the sensor assembly and using the gimbal drive assembly 30 and the roll axis drive 40 to align the gravity sensor with the vertical.

In conducting gravimetric surveys, the sonde 10 is lowered to a certain desired depth in the borehole on a wireline. The sonde 10 is then clamped to the borehole by a suitable clamping mechanism. The clamping mechanism ensures that the gravity sensor 65 is stable when gravity readings are taken. After the sonde 10 is secured to the borehole, the elevator mechanism 40 translates the gravity tool 20 inside the pressure vessel 18 until the gravity sensor 65 is aligned with a station. At the same time, the optical encoder 42 records the distance moved by the gravity tool 20.

At the measuring station, the accelerometers in the accelerometer assembly 34 measure instantaneous acceleration in three orthogonal directions. The electronic controller 32 uses the instantaneous accelerations from the accelerometers to determine the pitch and roll angles of the gravity tool 20 from a fixed reference. Based on the roll angle, the electronic controller 32 energizes the stepper motor of the roll-axis drive 36 to incrementally rotate the gravity tool 20 about an axis coincident with the longitudinal axis 26 of the pressure vessel 18. Also, based on the pitch angle, the electronic controller 32 energizes the stepper motor of the gimbal drive assembly 30 to incrementally rotate the bobbin 90 which in turn rotates the angular tilt sensor 110 and the gimbal 64. As the electronic controller 32 controls the roll-axis drive 36 and the gimbal drive assembly 30 to align the sensitive axis of the gravity sensor 65 with the vertical, the angular tilt sensor 110 sends signals indicative of the magnitude of departure of the sensitive axis of the gravity sensor 65 with respect to the vertical.

When the angular tilt sensor 110 indicates that the sensitive axis of the gravity sensor 65 is aligned with the vertical, the electronic controller 32 stops the gimbal drive assembly 30 and the roll-axis drive 36. The electronic controller 32 may send a signal to the surface to indicate that the gravity sensor 65 is aligned with the vertical. The gravity sensor 65 may then be activated from the surface to measure gravity. After measuring gravity, the elevator mechanism 40 moves the gravity tool 20 inside the pressure vessel 18 again until the gravity sensor 65 is aligned with the next measuring station. The optical encoder assembly 42 monitors the position of the gravity sensor 65 as the gravity sensor 65 moves inside the pressure vessel 18. Again, the controller 32 ensures that the sensitive axis of the gravity sensor 65 is aligned with the vertical before gravity readings are taken. The process of translating the gravity tool 20 inside the pressure vessel 18, aligning the sensitive axis of the gravity sensor 65 with the vertical, and activating the gravity sensor to measure gravity may continue until the gravity tool 20 touches the nose assembly 48. The distance between successive measuring stations in the pressure vessel is typically 1 m or more.

While the present invention has been described with respect to a limited number of preferred embodiments, those skilled in the art will appreciate numerous modifications and variations therefrom. For instance, the rotatable portion 22 of the gravity tool 20 may be extended to include the spring loaded harness assembly 44 so that the slip ring assembly 38 is not necessary to couple signals between the rotatable portion 22 and the non-rotatable portion 24 of the gravity tool 20. The appended claims are intended to cover all such modifications and variations which occur to one of ordinary skill in the art.

What is claimed is:

1. A survey tool for obtaining gravimetric data in a borehole, comprising:

- an elongated, hollow vessel;
- a sensor housing disposed inside the vessel, the sensor housing defining a thermally isolated chamber;
- a gimbal disposed inside the thermally isolated chamber, the gimbal being rotatably supported on a gimbal shaft, wherein the gimbal shaft has a pivot axis displaced from a longitudinal axis of the vessel;
- a gravity sensor disposed inside the thermally isolated chamber and coupled to the gimbal;
- a first drive means coupled to rotate the gimbal about the pivot axis;
- a second drive means coupled to rotate the gimbal about the longitudinal axis of the vessel;
- wherein the first and second drive means are located outside the thermally isolated chamber;
- a sensor assembly for determining inclination of the vessel with respect to vertical; and
- a controller configured to control the first and second drive means in response to signals from the sensor assembly.

2. The survey tool of claim 1, further including a conveyance mechanism for supporting and moving the tool inside the borehole.

3. The survey tool of claim 2, further including a casing collar locator for positioning the vessel at a predetermined depth inside the borehole.

4. The survey tool of claim 1, further including a mechanism for moving the gravity sensor from one station to another station inside the vessel, the mechanism configured to lift the weight of the sensor housing.

5. The survey tool of claim 4, wherein the mechanism for moving the gravity sensor includes a drive motor coupled to a worm drive, the worm drive configured to drive a pair of spur gears which support a pair of wheels that run against an inside diameter of the vessel.

6. The survey tool of claim 5, wherein a reduction gear box is coupled to the drive motor and the worm drive.

7. The survey tool of claim 5, wherein the drive motor is supplied with a clutch-brake to prevent the drive motor from turning when the gravity sensor is at a measuring station.

8. The survey tool of claim 4, further including means for determining the displacement of the gravity sensor from one station to the next inside the vessel.

9. The survey tool of claim 8, wherein the means for determining the displacement of the gravity sensor is a trailing wheel with an optical encoder.

10. The survey tool of claim 9, wherein the trailing wheel is made of a metal with low coefficient of thermal expansion.

11. The survey tool of claim 10, wherein the metal is invar.

12. The survey tool of claim 1, wherein the sensor housing includes a first dewar and a second dewar disposed inside the first dewar, wherein the thermally isolated chamber is located inside the second dewar.

13. The survey tool of claim 1, further including magnetic shield for protecting the gravity sensor from magnetic fields.

14. The survey tool of claim 12, further including means for stabilizing the temperature inside the thermally isolated chamber.

15. The survey tool of claim 1, wherein the first drive means includes a first stepper motor, the first stepper motor being responsive to signals from the controller and arranged to incrementally rotate the gimbal about the pivot axis.

16. The survey tool of claim 15, wherein the first stepper motor is coupled to a gear box which drives a rotatable winch, the rotatable winch being linked to the gimbal shaft by a cable system.

17. The survey tool of claim 15, further including a tilt sensor for measuring the angular tilt of the gravity sensor with respect to a fixed reference, the tilt sensor being configured to send signals indicative of the departure of the gravity sensor from vertical to the controller.

18. The survey tool of claim 17, wherein the tilt sensor is a single-axis accelerometer.

19. The survey tool of claim 1, wherein the first and second drive means are spatially separated from the sensor housing to minimize heat transfer between the drive means and the gravity sensor.

20. The survey tool of claim 1, wherein the second drive means includes a second stepper motor.

21. The survey tool of claim 1, wherein the sensor assembly includes three uniaxial accelerometers, the sensitive axes of the accelerometers being orthogonal to each other, and the sensitive axis of one of the accelerometers being aligned with the longitudinal axis of the vessel.

22. The survey tool of claim 1, wherein the sensor assembly is a triaxial accelerometer with one of the sensitive axes of the accelerometer aligned with the longitudinal axis of the vessel.

23. The survey tool of claim 1, further including means for connecting an electrical cable to an end of the vessel to remotely supply power thereto and receive signals therefrom.

24. The survey tool of claim 23, including a slip ring assembly for coupling signals between the cable and the first and second drive means.

25. The survey tool of claim 1, wherein the pivot axis of the gimbal shaft is orthogonal to the longitudinal axis of the vessel.

26. A survey tool for obtaining gravimetric data in a borehole, comprising:

an elongated, hollow vessel;

a sensor housing disposed inside the vessel, the sensor housing defining, a thermally isolated chamber;

a gimbal supported for rotation inside the thermally isolated chamber, the gimbal having a pivot axis displaced from a longitudinal axis of the vessel;

a gravity sensor disposed inside the thermally isolated chamber and coupled to the gimbal;

a tilt sensor coupled to the gravity sensor, the tilt sensor for measuring inclination of the gravity sensor with respect to vertical;

a sensor assembly for measuring inclination of the vessel with respect to vertical;

a first drive means coupled to rotate the gimbal about the pivot axis;

a second drive means coupled to rotate the gimbal about the longitudinal axis of the vessel;

the first and second drive means located outside the thermally isolated chamber and arranged to align the gravity sensor with vertical;

an elevator mechanism for moving the gravity sensor from one station to the next inside the vessel, the elevator mechanism configured to lift the weight of the sensor housing and the first and second drive means;

a trailing wheel configured to ride along the length of the vessel, the trailing wheel having an optical encoder for monitoring the position of the gravity sensor inside the vessel; and a controller configured to control the first and second drive means in response to signals from the sensor assembly.

27. A method of obtaining gravimetric data in a borehole, comprising the steps of:

coupling a gravity sensor to a gimbal and arranging the gravity sensor and the gimbal inside a thermally isolated chamber within a vessel;

coupling a drive means to rotate the gimbal, the drive means being located outside the thermally isolated chamber;

lowering the vessel to a predetermined depth in the borehole;

clamping the vessel to the borehole;

determining the inclination of the vessel with respect to vertical;

aligning the gravity sensor with vertical; and activating the gravity sensor to measure gravity at a measuring station inside the vessel.

28. The method of claim 27, wherein the step of aligning the gravity sensor with the vertical includes controlling a first drive means to rotate the gimbal about a pivot axis of the gimbal.

29. The method of claim 28, wherein the step of aligning the gravity sensor with the vertical further includes controlling a second drive means to rotate the gimbal about the longitudinal axis of the vessel.

30. The method of claim 27, further including the step of translating the gravity sensor from one measuring station to the next.

31. The method of claim 30, wherein the step of translating the gravity sensor includes monitoring the position of the gravity sensor.

* * * * *